United States Patent
Whiteside et al.

(10) Patent No.: US 9,969,215 B1
(45) Date of Patent: May 15, 2018

(54) FRAME FOR A CREEPER

(71) Applicant: Whiteside Mfg. Co., Delaware, OH (US)

(72) Inventors: Kirt E. Whiteside, Marion, OH (US); Chad E. Mays, Delaware, OH (US)

(73) Assignee: Whiteside Mfg. Co., Delaware, OH (US)

( * ) Notice: Subject to any disclaimer, the term of this patent is extended or adjusted under 35 U.S.C. 154(b) by 0 days. days.

(21) Appl. No.: 15/335,623

(22) Filed: Oct. 27, 2016

(51) Int. Cl.
*B25H 5/00* (2006.01)
*B60B 33/00* (2006.01)

(52) U.S. Cl.
CPC ........... *B60B 33/0007* (2013.01); *B25H 5/00* (2013.01); *B60B 33/0018* (2013.01)

(58) Field of Classification Search
CPC ....................................................... B25H 5/00
See application file for complete search history.

(56) References Cited

U.S. PATENT DOCUMENTS

| | | | | |
|---|---|---|---|---|
| 2,879,865 A * | 3/1959 | Simmons | ................ | B25H 5/00 188/69 |
| 4,570,957 A * | 2/1986 | Rose | ................ | B25H 5/00 188/5 |
| 4,721,316 A * | 1/1988 | Whiteside | ................ | B25H 5/00 280/32.6 |
| 5,174,592 A * | 12/1992 | Pool | ................ | B25H 5/00 280/32.6 |
| 5,213,350 A * | 5/1993 | Hermanson | ................ | B25H 5/00 280/32.6 |
| 5,348,367 A * | 9/1994 | Mizelle | ................ | A47C 1/035 297/321 |
| 5,527,051 A * | 6/1996 | Plaza | ................ | B25H 5/00 16/35 R |
| 5,730,449 A * | 3/1998 | Miles | ................ | B25H 5/00 280/32.5 |
| 5,895,062 A * | 4/1999 | Miles | ................ | B25H 5/00 280/32.6 |
| 6,076,838 A * | 6/2000 | Peterson | ................ | B25H 5/00 188/5 |
| 6,095,532 A * | 8/2000 | Martin | ................ | B25H 5/00 280/30 |
| 6,113,186 A * | 9/2000 | Holmes | ................ | A47C 1/124 297/248 |
| 6,238,069 B1* | 5/2001 | Miles | ................ | B25H 5/00 280/32.6 |

(Continued)

OTHER PUBLICATIONS

Flat Sided Oval. (Oct. 26, 2015) Retrieved from https://web.archive.org/web/20151026035139/http://www.louisianasteel.com/oval-steel-tubing.html.*

*Primary Examiner* — Katy M Ebner
(74) *Attorney, Agent, or Firm* — Renner, Kenner, Greive, Bobak, Taylor & Weber

(57) ABSTRACT

A frame (10) for a creeper includes spaced side rails (11) having a generally flat top surface (12) and a generally flat bottom surface (13). Opposed arcuate surfaces (14) extend between the ends of the top (12) and bottom (13) surfaces to form a generally oval profile for the side rails (11). A plurality of caster assemblies (15, 16, 17) each include a generally flat mounting plate (36) which is positioned adjacent to, and attached to, the flat bottom surface (13) of the side rails (11). A plurality of crossrails (23, 24, 25, 26) extend between the side rails (11) and are adapted to receive a pad.

11 Claims, 2 Drawing Sheets

(56) References Cited

U.S. PATENT DOCUMENTS

| | | | |
|---|---|---|---|
| 6,702,305 B2 * | 3/2004 | Miles | B25H 5/00 280/32.5 |
| 9,339,928 B1 * | 5/2016 | Obitts | B25H 5/00 |
| 2001/0020773 A1 * | 9/2001 | Whiteside | B25H 5/00 280/32.6 |
| 2002/0060437 A1 * | 5/2002 | Whiteside | B25H 5/00 280/32.6 |
| 2003/0168824 A1 * | 9/2003 | Miles | B25H 5/00 280/32.6 |
| 2004/0066020 A1 * | 4/2004 | Hernandez, Jr. | B25H 5/00 280/639 |
| 2006/0170170 A1 * | 8/2006 | Whiteside | B25H 5/00 280/32.6 |
| 2006/0186619 A1 * | 8/2006 | Sieb | B25H 5/00 280/32.6 |
| 2006/0192355 A1 * | 8/2006 | Hulden | B25H 5/00 280/32.6 |
| 2007/0013154 A1 * | 1/2007 | Staples | B25H 5/00 280/32.6 |
| 2007/0080510 A1 * | 4/2007 | Ji | B25H 5/00 280/32.6 |
| 2007/0228780 A1 * | 10/2007 | Grace | A47C 4/283 297/45 |
| 2007/0235960 A1 * | 10/2007 | Pantaleoni | B25H 5/00 280/32.6 |
| 2008/0012252 A1 * | 1/2008 | Hernandez | B25H 5/00 280/32.6 |
| 2008/0136129 A1 * | 6/2008 | Wu | B25H 5/00 280/32.6 |
| 2008/0296936 A1 * | 12/2008 | Tsonev | A47C 7/70 297/125 |
| 2008/0309035 A1 * | 12/2008 | Whiteside | B25H 5/00 280/32.6 |
| 2009/0085314 A1 * | 4/2009 | Diaz | B25H 5/00 280/32.6 |
| 2010/0123293 A1 * | 5/2010 | Benjamin | B25H 5/00 280/32.6 |
| 2011/0049822 A1 * | 3/2011 | Hinman | B25H 5/00 280/32.6 |
| 2011/0227302 A1 * | 9/2011 | Gillespie | B25H 5/00 280/32.6 |
| 2014/0159327 A1 * | 6/2014 | Smith | B62B 3/14 280/33.991 |
| 2014/0232075 A1 * | 8/2014 | Whiteside | B25H 5/00 280/32.6 |
| 2015/0084293 A1 * | 3/2015 | Huang | B60Q 1/24 280/32.6 |
| 2016/0332483 A1 * | 11/2016 | Sieb | B60B 33/0052 |

* cited by examiner

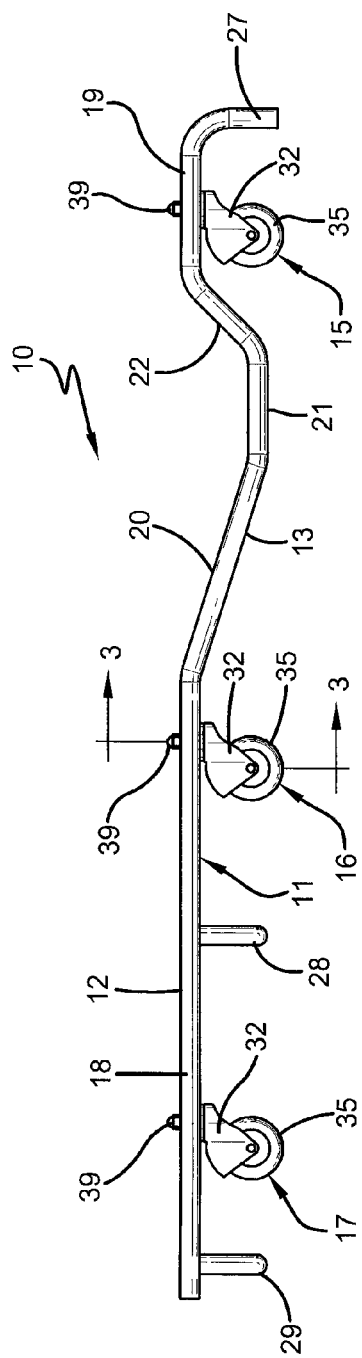
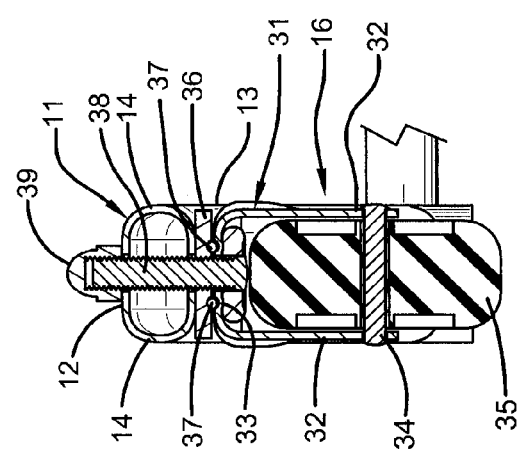
FIG. 2
FIG. 3

FRAME FOR A CREEPER

TECHNICAL FIELD

This invention relates to a frame for a creeper such as used by mechanics or the like. More specifically, this invention relates to the side rails of the frame for the creeper which provide comfort to the user while at the same time providing improved mounting of caster assemblies thereto.

BACKGROUND ART

Mechanic's creepers include a frame which carry a pad and which is supported by casters to render the creeper mobile. The frame most often includes side rails which carry the casters and a plurality of crossrails which extend between the side rails and which carry the pad.

Heretofore, most all of the rails, including the side rails, have either been of a round or a square profile. The round profile provides a degree of comfort to the user, but it is very difficult to mount casters to the round configuration. Moreover, in addition to being difficult to mount, the connection leads to maintenance problems in that the casters would often break free of their mounting. The rails of the square profile permit an easier and more secure mounting of the casters, but the corners of the rails present potential discomfort to the shoulders, arms, hips, and legs of the user.

DISCLOSURE OF THE INVENTION

It is thus an object of one aspect of the present invention to provide a frame for a creeper in which the caster assemblies can be easily and securely mounted to the side rails.

It is an object of an additional aspect of the present invention to provide a frame, as above, in which the casters can be connected with a shorter fastener adding to the stability of the connection.

It is an object of another aspect of the present invention to provide a frame for a creeper, as above, which is not uncomfortable for the user when in use.

These and other objects of the present invention, as well as the advantages thereof over existing prior art forms, which will become apparent from the description to follow, are accomplished by the improvements hereinafter described and claimed.

In general, a frame for a creeper includes spaced side rails each having a generally flat top surface, a generally flat bottom surface, and opposed arcuate surfaces extending between the top and bottom surfaces. A plurality of caster assemblies are attached to the bottom surface of each side rail.

A preferred exemplary frame for a creeper according to the concepts of the present invention is shown by way of example in the accompanying drawings without attempting to show all the various forms and modifications in which the invention might be embodied, the invention being measured by the appended claims and not by the details of the specification.

BRIEF DESCRIPTION OF THE DRAWINGS

FIG. 2 is a side elevational view of the creeper frame of FIG. 1.

FIG. 3 is a sectional view taken substantially along line 3-3 of FIG. 2.

PREFERRED EMBODIMENT FOR CARRYING OUT THE INVENTION

Figure 1:
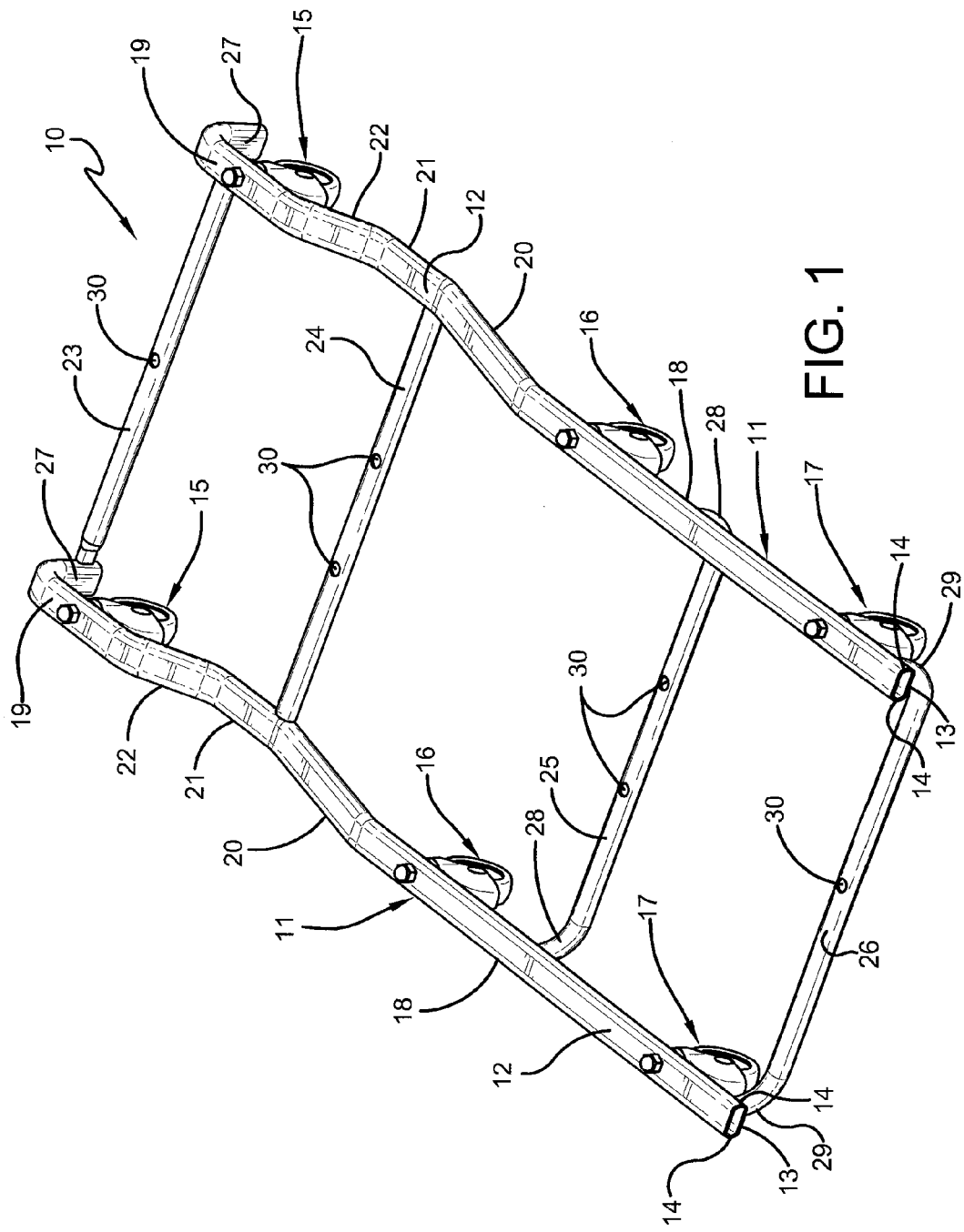
FIG. 1 is a perspective view of a creeper frame made in accordance with the concepts of the present invention.

A frame for a creeper, typically used by a mechanic, is indicated generally by the numeral 10. Creeper frame 10 includes opposed side rails generally indicated by the numeral 11 which have a flat top surface 12 and a flat bottom surface 13 interconnected by opposed arcuate surfaces 14. As a result, the overall profile or cross section of side rails 11 is generally oval.

Each side rail 11 is shown as carrying three caster assemblies generally indicated by the numerals 15, 16 and 17, the details of which will be hereafter described in more detail. Caster assembly 15 is generally at the front or head end of creeper frame 11, caster assembly 17 is at the opposed or rear end of frame 11, and caster assembly 16 is positioned generally centrally therebetween. Each side rail is generally horizontal between caster assemblies 16 and 17, as at area 18, and is generally horizontal over caster assembly 15, as at area 19. Areas 18 and 19 are on the same plane. Between areas 18 and 19, and between caster assemblies 16 and 15, each side rail extends downwardly, as at portion 20, to a horizontal portion 21, and then back upwardly, as at portion 22, to horizontal area 19 over caster assembly 15. The area of side rails 11 at portions 20, 21, and 22 together form a comfortable area to receive the shoulders and upper body of the user.

The side rails 11 are laterally interconnected by a plurality of crossrails 23, 24, 25 and 26 which may have a round or square profile, as might be desired. These crossrails all lie in the same place at the level of horizontal side rail portion 21 where crossrail 24 is mounted. In order to mount crossrail 23 at that level, the ends 27 of side rails 11 extend downwardly at the head end of frame 12, and these ends 27 carry crossrail 23. These downwardly extending ends 27 also serve to protect caster assemblies 15 and also to isolate them from, for example, the hair of the user. In order to mount crossrail 25 at the level of crossrails 23 and 24, the ends 28 of crossrail 25 curve upwardly and attach to the bottom surface 13 of side rails 11 at side rail area 18. Similarly, in order to mount crossrail 26 at the level of the other crossrails 23, 24 and 25, the ends 29 of crossrail 26 curve upwardly and attach to the bottom surface 13 at the end of side rails 11. Together, crossrails 23, 24, 25 and 26 are adapted to horizontally hold a creeper pad. For ease of connection between the crossrails and the pad, crossrails 23, 24, 25 and 26 are all provided with apertures 30 so as to easily receive fasteners which extend up into the pad.

As previously described, caster assemblies 15, 16 and 17 are easily and conveniently attachable to the flat bottom surface 13 of frame 11. These caster assemblies are all identical and the construction of each is shown in conjunction with caster assembly 16 shown in FIG. 3. Thus each caster assembly includes a bracket or horn, generally indicated by the numeral 31, which is generally U-shaped and thus includes branches 32 connected at their tops by a base 33. An axle 34 extends between branches 32 to rotatably carry a wheel 35 typically made of hard rubber or plastic. A doughnut-shaped mounting plate 36, which is flat at its top and which has a recess in its bottom, is positioned adjacent to the bottom surface 13 of side rail 11, and adjacent to the base 33 of bracket 31. Base 33 and the recess in the bottom of plate 36 form a raceway for ball bearings 37. A bolt 38 or equivalent fastening device attaches bracket 31 to side rail 11 with the mounting plate 36 therebetween, and a cap nut 39 is received on the end of bolt 38. Because of the oval profile of the side rails 11, bolt 38 need not be very long which minimizes the chances for failure. In addition, the flat-to-flat connection of mounting plate 36 and side rail surface 13, provides a convenient, sturdy connection. When so connected, bracket 31 and wheel 35 can rotate on the axis defined by bolt 38 with the aide of ball bearings 37, such that the caster assemblies may swivel with respect to frame 10.

In view of the foregoing, it should be appreciated that a creeper frame constructed as described herein accomplishes the objects of the invention and otherwise substantially improves the art.

What is claimed is:

1. A frame for a creeper comprising spaced side rails; each said side rail having a generally flat top surface, a generally flat bottom surface, and opposed arcuate surfaces extending between said top and bottom surfaces; and a plurality of caster assemblies attached to said bottom surface of each said side rail, wherein each said caster assembly includes a bracket, an axle rotatably carried by said bracket, a wheel rotatably carried by said axle, and a flat mounting plate positioned adjacent to said flat bottom surface of each said side rail; wherein said flat mounting plate has a length defined by a distance between said opposed arcuate surfaces of said each side rail and wherein said flat mounting plate has a flat surface contacting the bottom surface of each said side rail for the majority of the length of said flat mounting plate.

2. The frame of claim 1 wherein a first said caster assembly is positioned at the front end of each said side rail, a second said caster assembly is positioned at the opposed, rear end of said side rail, and, a third said caster assembly is positioned generally medially between said first and second caster assemblies.

3. The frame of claim 2 wherein each said side rail includes a first generally horizontal area between said second and third caster assemblies and a second generally horizontal area over said first caster assembly, said first and second areas being generally in the same plane.

4. The frame of claim 3 wherein each said side rail includes a first portion extending downwardly from said first area and a second portion extending downwardly from said second area, and a third generally horizontal area extending between said first and second portions.

5. A frame for a creeper comprising spaced side rails; each said side rail having a generally flat top surface, a generally flat bottom surface, and opposed arcuate surfaces extending between said top and bottom surfaces; and a plurality of caster assemblies attached to said bottom surface of each said side rail; said caster assembly including a first caster assembly positioned at the front end of each said side rail, a second caster assembly positioned at the opposed, rear end of said side rail, and a third caster assembly positioned generally medially between said first and second caster assemblies; each said side rail including a first generally horizontal area between said second and third caster assemblies and a second generally horizontal area over said first caster assembly, said first and second areas being generally in the same plane; each said side rail also including a first portion extending downwardly from said first area, a second portion extending downwardly from said second area, and a third generally horizontal area extending between said first and second portions; and a first crossrail extending between said third areas of said side rails.

6. The frame of claim 5 wherein each said side rail at the front end has a portion which curves downwardly, and further comprising a second crossrail extending between said portions of said side rails which curve downwardly.

7. The frame of claim 6 further comprising a third crossrail having ends which extend upwardly and which are attached to said first areas of said side rails.

8. The frame of claim 7 further comprising a fourth crossrail having ends which extend upwardly and which are attached near said rear end of said side rails.

9. The frame of claim 1 further comprising a plurality of crossrails extending laterally between said side rails and adapted to carry a pad.

10. The frame of claim 1 wherein said bracket is positioned adjacent to said mounting plate with a plurality of bearings received between said bracket and said mounting plate, and wherein each said caster assembly includes a fastener to attach said bracket and said mounting plate to said side rail.

11. The frame of claim 10 wherein said fastener extends through said bottom and top surfaces of said side rails and receives a cap nut thereon.

* * * * *